(12) United States Patent
Frouin et al.

(10) Patent No.: US 10,473,074 B2
(45) Date of Patent: Nov. 12, 2019

(54) LEAKAGE RETURN CIRCUIT CONNECTOR

(71) Applicant: DELPHI TECHNOLOGIES IP LIMITED, St. Michael (BB)

(72) Inventors: Thierry Frouin, Vineuil (FR); Alain Amand, Blois (FR)

(73) Assignee: DELPHI TECHNOLOGIES IP LIMITED (BB)

( * ) Notice: Subject to any disclaimer, the term of this patent is extended or adjusted under 35 U.S.C. 154(b) by 0 days.

(21) Appl. No.: 16/075,319

(22) PCT Filed: Feb. 2, 2017

(86) PCT No.: PCT/EP2017/052288
§ 371 (c)(1),
(2) Date: Aug. 3, 2018

(87) PCT Pub. No.: WO2017/134180
PCT Pub. Date: Aug. 10, 2017

(65) Prior Publication Data
US 2019/0040829 A1    Feb. 7, 2019

(30) Foreign Application Priority Data
Feb. 5, 2016    (FR) ..................... 16 50958

(51) Int. Cl.
*F02M 55/02*    (2006.01)
*B29C 45/26*    (2006.01)
(Continued)

(52) U.S. Cl.
CPC .......... *F02M 55/02* (2013.01); *B29C 33/306* (2013.01); *B29C 45/2673* (2013.01);
(Continued)

(58) Field of Classification Search
CPC ............ B29C 45/2673; B29C 45/2675; B29C 33/306; F02M 55/02; F02M 57/026;
(Continued)

(56) References Cited

U.S. PATENT DOCUMENTS

2010/0244302 A1* 9/2010 Okuno .................. F02M 55/02
264/138
2010/0244434 A1* 9/2010 Okuno .................. F02M 55/02
285/24
(Continued)

FOREIGN PATENT DOCUMENTS

EP    1394402 A2    3/2004
WO    2005061940 A1    7/2005

*Primary Examiner* — Sizo B Vilakazi
(74) *Attorney, Agent, or Firm* — Joshua M. Haines

(57) ABSTRACT

A method for molding a connector which includes a connecting element having a cylindrical body and, one arm extending along an arm axis for the L-shaped connector or, two arms extending along two different arm axes for the T-shaped connector, the body being capable of being connected to an injector, and each arm being capable of being connected to the end of a pipe. The molding method includes a) providing a mold having a cavity for a T-shaped connecting element, the cavity including a cavity for a body and two cavities for arms and b) arranging an insert in the cavity for one of the two arms when an L-shaped connecting element is to be molded.

7 Claims, 7 Drawing Sheets

(51) Int. Cl.
*B29C 33/30* (2006.01)
*F02M 55/00* (2006.01)
*F02M 57/02* (2006.01)

(52) U.S. Cl.
CPC ....... B29C 45/2675 (2013.01); F02M 55/005 (2013.01); F02M 57/026 (2013.01); *F02M 55/002* (2013.01); *F02M 2200/85* (2013.01); *F02M 2200/856* (2013.01)

(58) Field of Classification Search
CPC ............... F02M 55/005; F02M 55/002; F02M 2200/856; F02M 2200/85
See application file for complete search history.

(56) References Cited

U.S. PATENT DOCUMENTS

| | | | |
|---|---|---|---|
| 2014/0283678 A1* | 9/2014 | Takimoto | F02M 55/02 92/143 |
| 2016/0018035 A1* | 1/2016 | Seong | F02M 59/44 285/34 |
| 2016/0096300 A1* | 4/2016 | Hopfner | B29C 45/2675 425/161 |

* cited by examiner

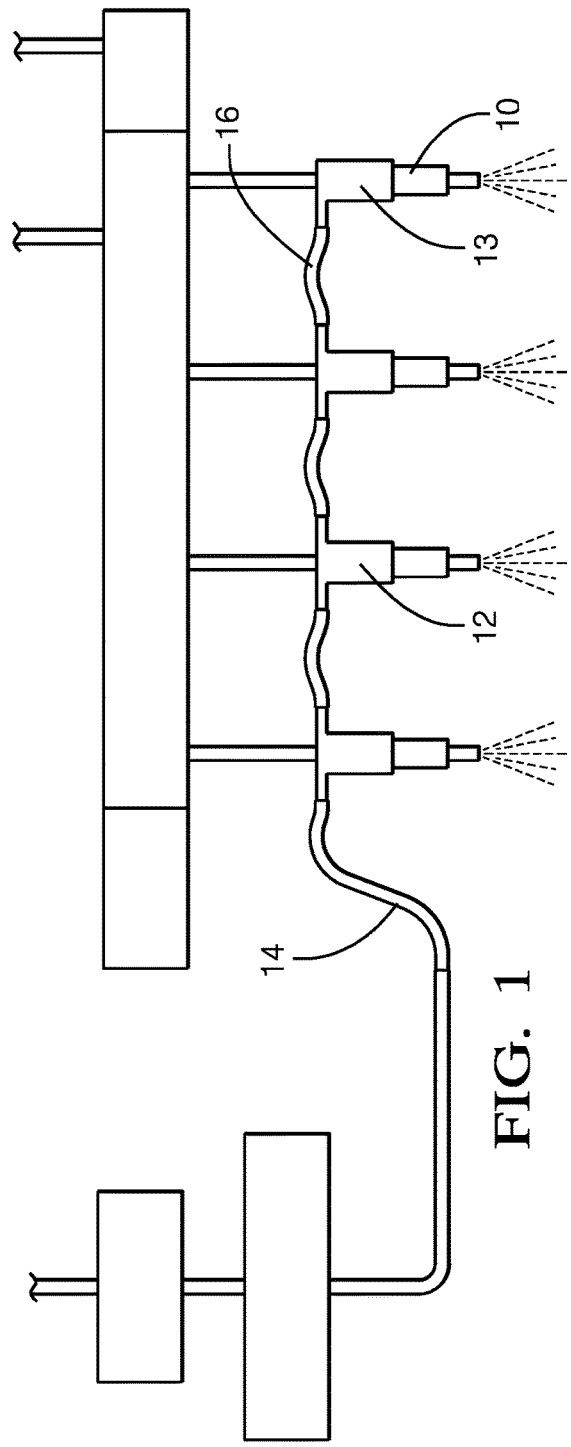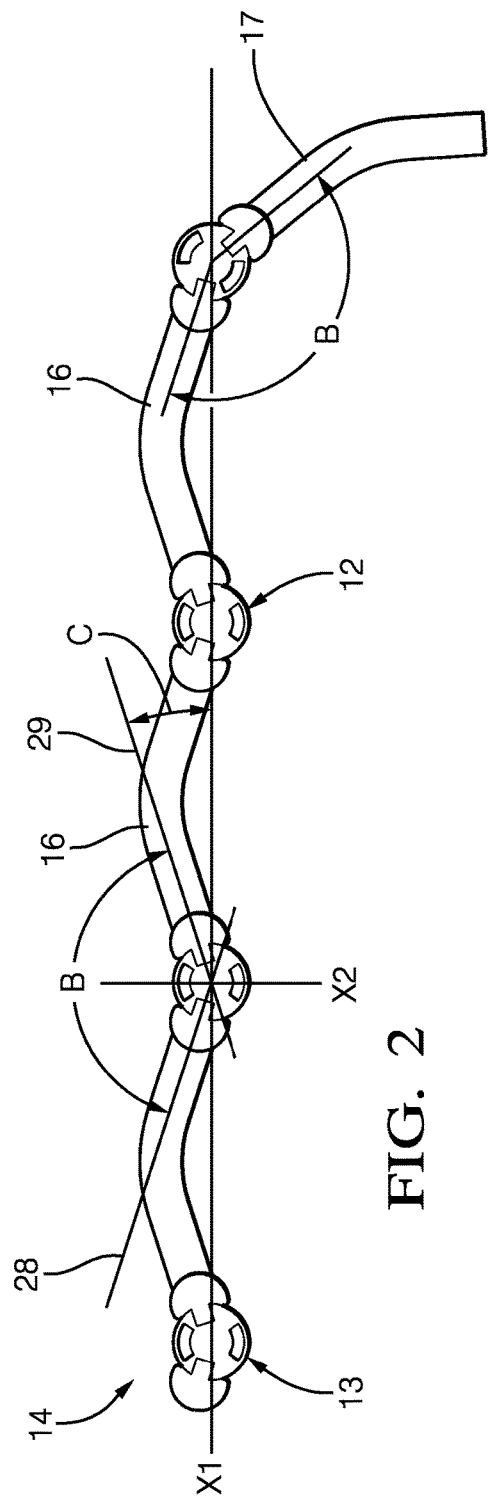

LEAKAGE RETURN CIRCUIT CONNECTOR

CROSS REFERENCE TO RELATED APPLICATIONS

This application is a national stage application under 35 USC 371 of PCT Application No. PCT/EP2017/052288 having an international filing date of Feb. 2, 2017, which is designated in the United States and which claimed the benefit of FR Patent Application No. 1650958 filed on Feb. 5, 2016, the entire disclosures of each are hereby incorporated by reference in their entirety.

TECHNICAL FIELD

The present invention relates to a low-pressure fuel injector backleak circuit and more particularly to the manufacture of the circuit connectors.

TECHNICAL BACKGROUND OF THE INVENTION

The present invention relates more particularly to a fuel, for example diesel fuel, injector connector intended to connector the injector to the low-pressure injector backleak hydraulic circuit arranged in a motor vehicle and intended to collect the fuel coming from the injector and store it in the fuel tank.

The hydraulic backleak circuit comprises both pipe elements and injector connectors. The circuit is connected to all the injectors of the injection system and extends in a line along the engine cylinders. It comprises an L-shaped first connector for the injector situated at one end of the engine block and then T-shaped connectors for the subsequent injectors, short pipe elements joining the connectors together. Thus, an in-line four-cylinder engine comprises one L-shaped connector, three T-shaped connectors and three short pipe elements. A final pipe element longer than the others connects the final T-shaped connector to the fuel tank.

Evolutions in fuel injection systems and reduction in fuel consumption in the vehicle have led to increased injection pressures which may reach 2500 bar and temperatures as high as 150° C. with spikes at 160-170° C. The backleak hydraulic circuits need to be able to withstand these temperatures and to withstand a positive pressure of the order of 6 bar, and this entails expensive materials for the pipe elements. In addition, the connectors comprise an L-shaped or T-shaped coupling element locked in a tubular cage by a locking cap. The T-shaped coupling elements comprise arms which make angles with one another. The T-shaped connectors differ from one another because the angles between the arms may differ on the one same hydraulic circuit in order to make it easier to install on the engine. The three pieces of the T-shaped or L-shaped connector are made of molded plastic. The L-shaped coupling elements require a different mold to the T-shaped coupling elements. In addition, the production flexibility imposed by innumerable alternative forms of engine build (form, number of cylinders) is expensive and technically challenging.

It is an object of the present invention to address these disadvantages by proposing a solution that is economical and flexible in the production of the T-shaped and L-shaped connectors.

SUMMARY OF THE INVENTION

The present invention seeks to overcome the aforementioned disadvantages by proposing a method for molding a hydraulic connector made of molded plastic. The connector is exclusively designed to be arranged in a direct diesel fuel injection equipment backleak hydraulic circuit for an internal combustion engine. In addition, the connector may be T-shaped or L-shaped. The connector additionally comprises:

a coupling element having a roughly cylindrical body with body axis, and an arm extending along an arm axis perpendicular to the body axis in the case of the L-shaped connector, or two arms extending along two distinct arm axes perpendicular to the body axis in the case of the T-shaped connector, the body being able to be connected to a fuel injector, and each arm being able to be connected to the end of a pipe element, and a tubular cylindrical cage extending along the axis of the body, the cage being provided with two lateral cutouts, the body being arranged in the cage, each cutout allowing an arm to extend, and a locking cap also clipped onto one end of the tubular cage so as to hold the coupling element captive in the cage. In addition, the molding method comprises the following steps:

a) providing a mold with an impression of a T-shaped coupling element, said impression comprising an impression of the body and two impressions of the arms;

b) arranging an insert in the impression of one of the two arms when the intention is to mold an L-shaped coupling element.

In addition, the mold is a multi-impression mold all the impressions of which are identical, each one comprising a body impression and two arm impressions. In addition, the impressions of the arms make an angle between them, such that the arms of the coupling element make said angle between them, said angle being inscribed in a plane perpendicular to the axis of the body. In addition, said angle is comprised between 120° and 180°, preferably around 150°.

In addition, the method for producing the backleak hydraulic circuit is exclusively designed for direct diesel fuel injection equipment for an internal combustion engine. In addition, the circuit extends between an L-shaped first connector and a T-shaped final connector and comprises a plurality of intermediate T-shaped connectors and a plurality of pipe elements. In addition, the arms of all the connectors are roughly aligned in a main direction and a pipe element is arranged between two adjacent connectors. In addition, the method is characterized in that all the connectors are made according to the preceding embodiments. In addition, all the connectors are arranged in such a way that the axes of the arms make a roughly constant angle with the main direction, said angle being roughly equal to 90°−B/2.

In addition, the T-shaped connector arranged at the end of the circuit is rotated about the axis of the body by an angle roughly equal to the inter-arms angle with respect to the other T-shaped connectors of the hydraulic circuit. In addition, the pipe elements have identical lengths. In addition, the hydraulic circuit comprises the T-shaped connector described hereinabove and arranged at the end of the circuit and comprising the connectors produced by the molding method described above.

BRIEF DESCRIPTION OF THE DRAWINGS

Further features, objects and advantages of the invention will become apparent from reading the detailed description which will follow, and with reference to the attached drawings, given by way of purely nonlimiting example, and in which:

FIG. 1 is a block diagram of the fuel injection system,
FIG. 2 is a plan view of the hydraulic circuit.

DESCRIPTION OF THE PREFERRED EMBODIMENTS

Figure 3:
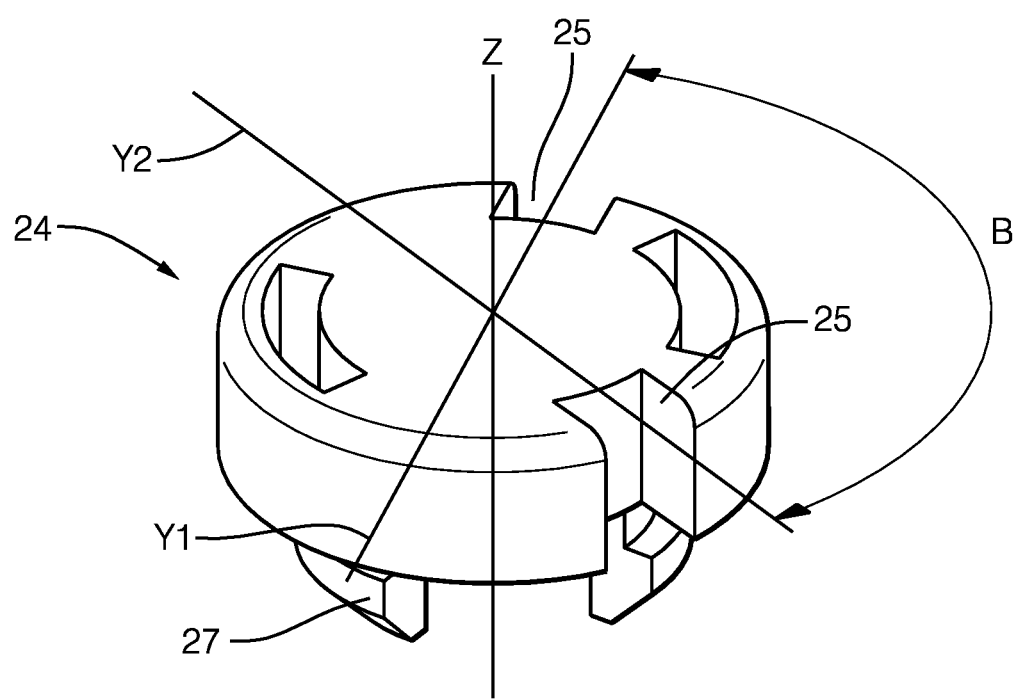
FIG. 3 is a view of the cap.

The invention is now described with reference to the figures and for the sake of clarity and conciseness of the description, the orientation of the figures will be used without any intended limitation as to the scope of the protection, notably with regards to the various ways in which an injector is installed in a vehicle. Words such as "top, bottom, underneath, on top, vertical, rise, fall, etc." will be used without any intended limitation and will apply specifically to each figure. In the remainder of the description, elements which are identical or similar will be denoted by the same references.

According to FIG. 1, in an internal combustion engine, a backleak hydraulic circuit 14 is a low-pressure circuit connecting the fuel injectors 10 to a fuel tank. The backleak hydraulic circuit 14 is connected to all the fuel injectors 10 and extends in a line along the cylinders of the engine block (not depicted). Fuel under high pressure is conveyed to the fuel injectors 10 then the fuel is atomized in the combustion chamber and some of the fuel returns to the fuel tank via the backleak hydraulic circuit 14.

According to FIG. 2, the hydraulic circuit 14 comprises an L-shaped first connector 13 for the injector situated at one end of the engine block and then T-shaped connectors 12 for the next injectors, short pipe elements 16 connecting the connectors together. With reference to FIG. 2, the hydraulic circuit 14 is connected to an in-line four-cylinder engine (not depicted) comprising an L-shaped connector 13 on the left, three T-shaped connectors 12 and three short pipe elements 16. A final pipe element 17 longer than the others connects the final T-shaped connector 12 on the right to the fuel tank (not depicted). With reference to FIG. 2, two axes X1, X2 are mutually orthogonal and represent the plane of FIG. 2.

The pipe elements 16 are made of plastic materials or elastomeric material giving flexibility in assembling the hydraulic circuit 14 and installing it on the engine. The layout of the backleak hydraulic circuit 14 is designed to minimize the lengths of the pipe elements 16 and the number of different T-shaped connectors 12 and L-shaped connectors 13 by connecting them along an overall direction X1. According to FIG. 2, the hydraulic circuit 14 is in a line in the overall direction X1. According to other alternatives, the hydraulic circuit may also be branched like a tree, which means to say that the connectors are L-shaped 13 and connected to the circuit by pipe elements 16.

According to FIG. 2, which is a plan view of the backleak hydraulic circuit 14, the four cylinders of the engine (not depicted) are underneath the hydraulic circuit 14. The circuit is configured in such a way as to have the center of the four connectors aligned in the overall direction X1 running from right to left with the backleak circuit 14. The T-shaped connector 12 on the right and at one end of the circuit 14 allows the pipe element 17 to be turned in such a way that the pipe element 17 can turn upward or downward along the axis X2 in the space left by the engine. In the example depicted, the T-shaped connector 12 arranged at the end is rotated through around 150 degrees with respect to the other T-shaped connectors 12 and L-shaped connectors 13 aligned in the overall direction X1.

The T-shaped connectors 12 comprise arms 28, 29 which make an angle B between them in the plane (X1, X2). This build of the hydraulic circuit 14 thus provides flexibility in laying out the connectors and pipe elements according to the type of prime mover. All that is then required is to fit as many connectors as there are injectors in an overall direction X1.

According to FIGS. 3, 4, 5, and 6, the T-shaped hydraulic connector 12 of the backleak hydraulic circuit 14 comprises a tubular cage 20, a T-shaped coupling element 22 and a locking cap 24.

Likewise according to FIGS. 3, 5, 7 and 8, the L-shaped hydraulic connector 13 of the backleak hydraulic circuit 14 comprises the tubular cage 20, an L-shaped coupling element 23 and the locking cap 24. The tubular cage 20 and the locking cap 24 are common to all the T-shaped connectors 12 and L-shaped connectors 13 of the backleak circuit 14.

According to FIG. 3, the locking cap 24 comprises two straight slots 24 which between them make the angle B of 150 degrees but which could in other alternatives adopt any value for example between 120 degrees and 180 degrees. In addition, the cap 24 comprises two clips 27 extending downward along a vertical axis Z.

Figure 4:
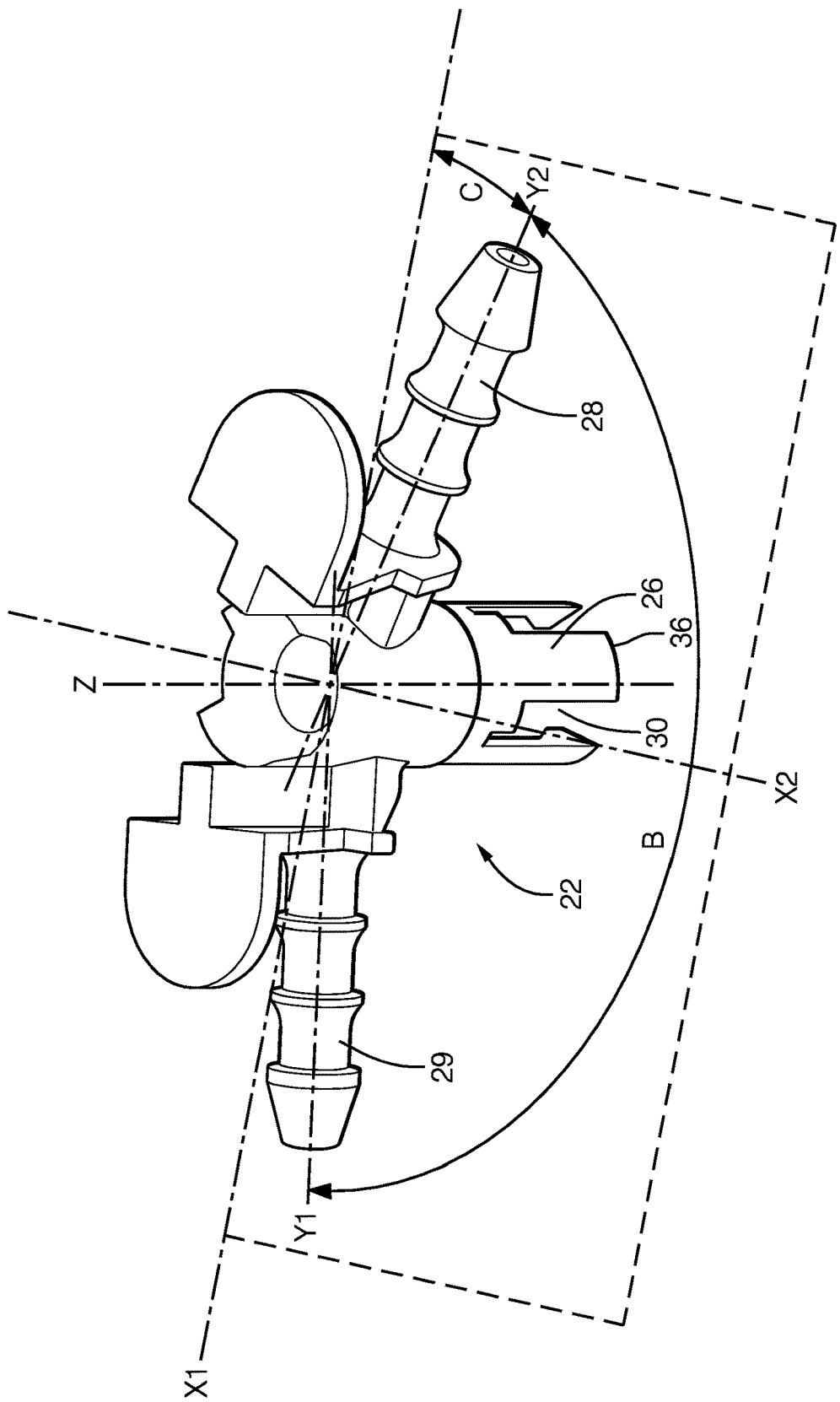
FIG. 4 is a view of the T-shaped coupling element.

According to FIG. 4, the two arms (28, 29) of the T-shaped coupling element 22 extend along two distinct arm axes (Y1, Y2) perpendicular to a body axis (Z) in the case of the T-shaped connector 12. The T-shaped coupling element 22 comprises an elongate body 26 with four cutouts 30 opening onto one end 36 and extending along the axis Z and two arms 28, 29 which are perpendicular to the body 26 extending along the axis Y1. The body 26 is connected to the fuel injector 10 by the end 36 and comprises an internal duct for the circulation of fuel towards the hydraulic circuit 14. The two axes of the arms (Y1, Y2) make a roughly constant angle (C) with the main direction (X1), said angle (C) being roughly equal to 90°−B/2.

Figure 5:
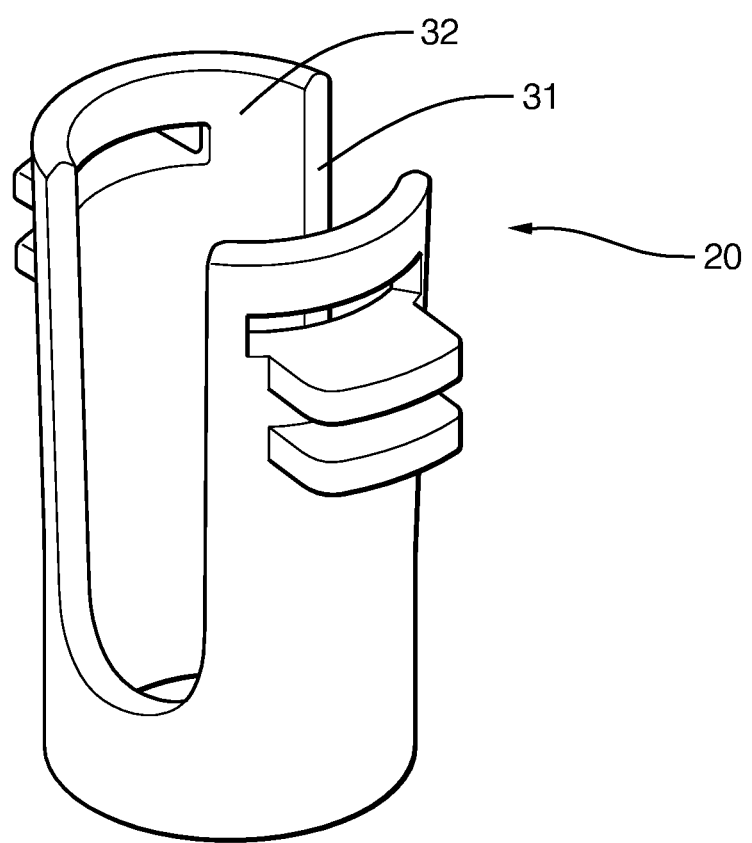
FIG. 5 is a view of the cage.

According to FIG. 5, the tubular cage 20 comprises a cylindrical wall and, along the wall, two lateral cutouts 31 opening only at one end 32 so as to give the cylindrical wall for the cage 20 elasticity as the coupling element 22 is inserted.

Figure 6:
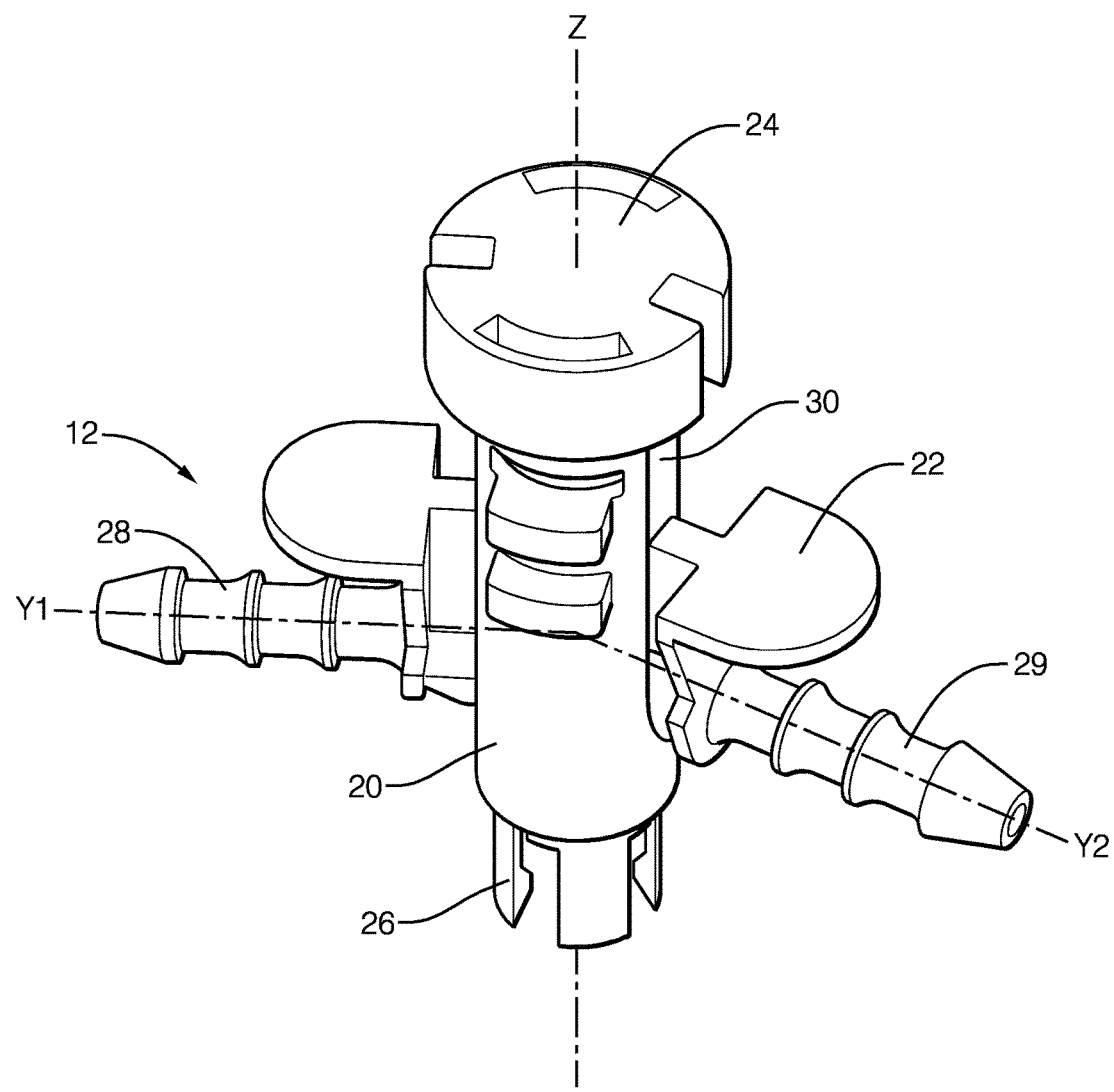
FIG. 6 is a view of the T-shaped connector, assembled.

According to FIG. 6, the arms 28, 29 are ribbed and are ogee-shaped at their ends. The arms 28 comprise an internal duct for the circulation of fuel to the pipe elements 16. The body 26 is able to be connected to a fuel injector (not depicted) and each arm 28 is able to be connected to the end of a pipe element 16. The body 26 is arranged inside the cage 20, each arm 28 extending through a cutout 30.

Figure 7:
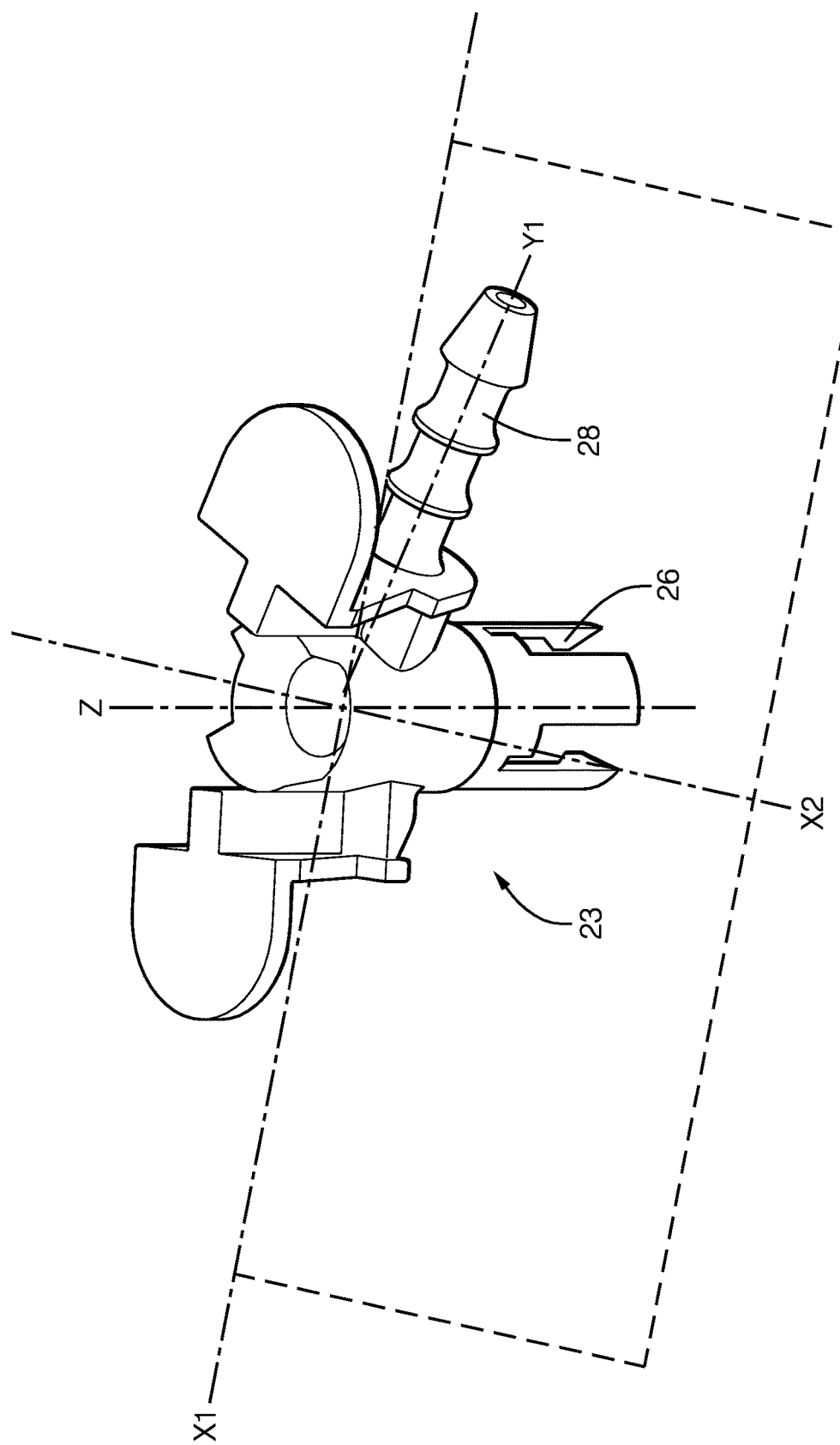
FIG. 7 is a view of the L-shaped coupling element.

With reference to FIG. 7, the coupling element 23 comprises a body 26 extending along the longitudinal axis Z and a single arm 28 perpendicular to the body 26 and extending along the axis Y1.

Figure 8:
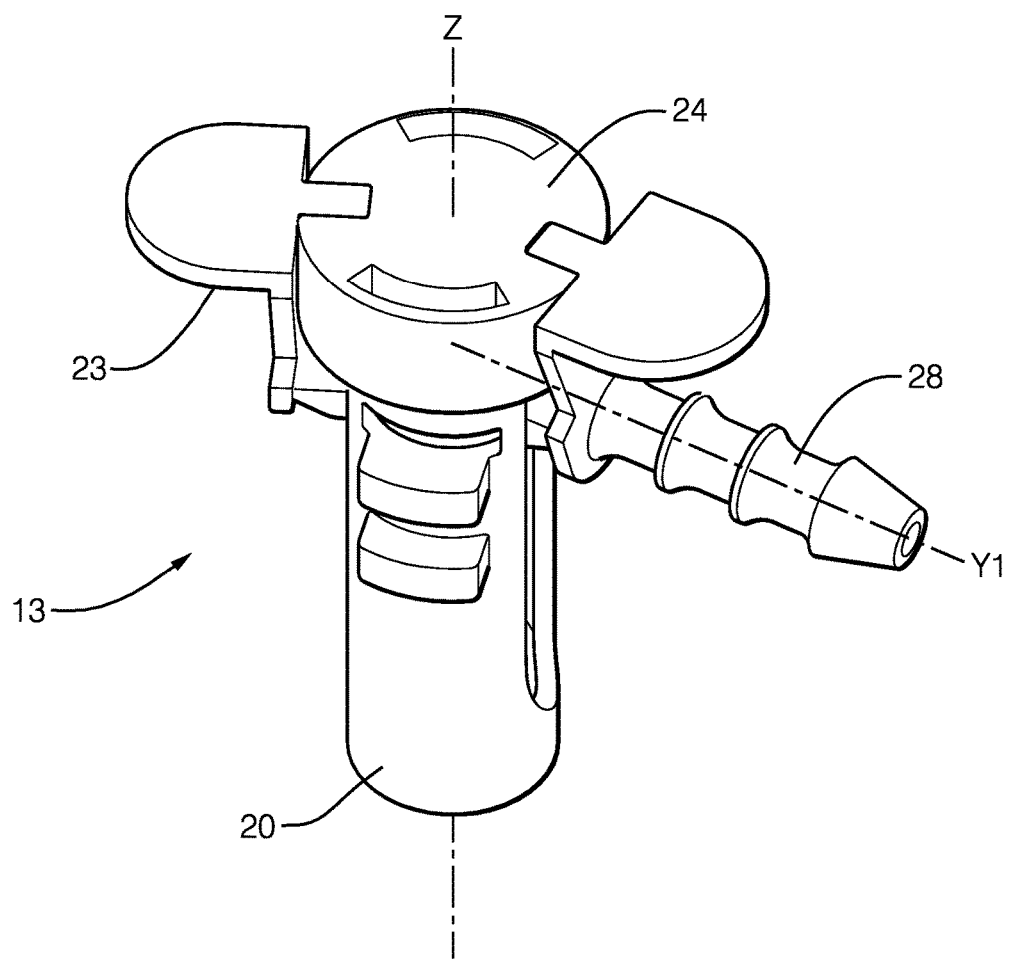
FIG. 8 is a view of the L-shaped connector, assembled.

With reference to FIG. 8, the L-shaped connector 13 is identical to the T-shaped connector 12 except that the coupling element 23 comprises just one arm 28. Thus, the L-shaped connector 13 differs from the T-shaped connector 12 in that the L-shaped coupling element 23 has just one arm 28 whereas the T-shaped coupling element 22 of the T-shaped connector 12 comprises two arms 28, 29.

In one preferred embodiment, the manufacture and assembly for the T-shaped connector 12 and L-shaped connector 13 will be described in detail:

First of all, the T-shaped connectors 12 and L-shaped connectors 13 are made from molded plastic. The coupling element 22, 23, the tubular cage 20 and the locking cap 24 are made of plastic. They are produced by a plastic injection molding method described in the following steps:

proving a mold intended to mold the T-shaped coupling elements 22 and L-shaped coupling elements 23, the mold having an impression of a coupling element 22, said impression comprising one body impression 26 and two arm impressions 28.

Providing a mold intended for molding the tubular cage 20 and a mold for the locking cap 24.

Placing an insert in the impression of one arm 28 when the plan is to mold an L-shaped coupling element 23.

Injecting plastic into each of the abovementioned molds in order to create the T-shaped connector elements 12, and L-shaped connector elements 13 of the backleak hydraulic circuit 14.

The T-shaped 12 and L-shaped 13 hydraulic connectors of the backleak hydraulic circuit 14 are assembled according to the following steps:

Assembling the T-shaped connector 12 by coaxially inserting the coupling element 22 into the tubular cage 20 on the side of the open end 32 of the cage 20.

Assembling the L-shaped connector 13 by coaxially inserting the coupling element 23 into the tubular cage 20 on the side of the open end 32 of the tubular cage 20.

Finishing assembling the T-shaped connector 12 by inserting the locking cap 24 in the open end 32 of the tubular cage 20 already assembled with the coupling element 22, then finally clipping the cap 24 into the cage 20, locking same. The cap 24 comprises a polarizing device for mounting in the cage 20 assembled with the coupling element 22.

Finishing assembling the L-shaped connector 13 by inserting the locking cap 24 in the open end 32 of the tubular cage 20 already assembled with the coupling element 23 then finally clipping the cap 24 into the cage 20, locking same. The cap 24 comprises a polarizing device for mounting in the cage 20 assembled with the coupling element 23.

The backleak hydraulic circuit 14 is intended exclusively for diesel direct fuel injection equipment for an internal combustion engine. If the internal combustion engine comprises a number "N" of fuel injectors 10 then the backleak hydraulic circuit 14 comprises "N" T-shaped and L-shaped connectors 12 and 13 and "N–1" pipe elements 16. The T-shaped connectors 12 and L-shaped connectors 13 comprise "N–1" T-shaped connectors 12 and one L-shaped connector 13. The backleak circuit 14 is created so that it extends between an L-shaped first connector 13 and a T-shaped connector 12.

The backleak circuit 14 is assembled according to the following steps:

arranging pipe elements 16 in the arms 28, 29 of the coupling element 22 of the T-shaped connector 12 so as to create the central line of the backleak circuit 14 in the main direction X1 with a plurality of pipe elements 16 and a plurality of T-shaped connectors 12, one pipe element 16 being arranged between two adjacent T-shaped connectors 12.

assembling the circuit 14 by adding a T-shaped connector 12 and an L-shaped connector 13 to the ends. At one end of the backleak hydraulic circuit 14 the T-shaped connector 12 is assembled with a rotation through 150° with respect to the T-shaped connectors 12 of the hydraulic circuit 14 which have already been assembled in the main direction X1. An L-shaped connector 13 is added at the other end.

LIST OF REFERENCES

10 Injector
12 T-shaped connector
13 L-shaped connector
14 Circuit
16 Pipe element
17 Long pipe element
20 Tubular cage
22 T-shaped coupling element
23 L-shaped coupling element
24 Cap
25 Slot
26 Body
27 Cap clip
28 Arm
29 Arm
30 Coupling element cutout
31 Cage cutout
32 Cage end
36 Coupling element end
X1 Main direction
X2 Axis
Y1 Axis
Y2 Axis
Z Axis
B Angle
C Angle

The invention claimed is:

1. A method for molding a hydraulic connector made of molded plastic, the hydraulic connector being designed exclusively to be arranged in a diesel fuel backleak hydraulic circuit of direct injection equipment for an internal combustion engine, it being possible for the hydraulic connector to be T-shaped or L-shaped, the hydraulic connector comprising 1) a coupling element having a roughly cylindrical body with a body axis, and an arm extending along an arm axis perpendicular to the body axis in the case of the hydraulic connector being L-shaped, or two arms extending along two distinct arm axes perpendicular to the body axis in the case of the hydraulic connector being T-shaped, the cylindrical body being able to be connected to a fuel injector, and each arm being able to be connected to an end of a pipe element; 2) a tubular cylindrical cage extending along the body axis, the tubular cylindrical cage being provided with two lateral cutouts, the cylindrical body being arranged in the tubular cylindrical cage, each lateral cutout allowing one of the arms to extend therethrough; and a locking cap clipped onto one end of the tubular cylindrical cage so as to hold the coupling element captive in the tubular cylindrical cage; the method comprising the following steps:

a) providing a mold with an impression of a T-shaped coupling element, said impression comprising an impression of the cylindrical body and two impressions of the arms;

b) arranging an insert in the impression of one of the two arms when the intention is to mold an L-shaped coupling element.

2. The method as claimed in claim 1, in which the mold is a multi-impression mold, all the impressions of which are identical, each one comprising a body impression and two arm impressions.

3. The method as claimed claim 1 in which the impressions of the arms make an angle between them, such that the arms of the coupling element make said angle between them, said angle being inscribed in a plane perpendicular to the axis of the body.

4. The method as claimed in claim 3, in which said angle is between 120° and 180°.

5. A method for producing a hydraulic backleak circuit exclusively intended for direct diesel fuel injection equipment for an internal combustion engine, the hydraulic backleak circuit extending between an L-shaped first connector and a T-shaped last connector and comprising a plurality of T-shaped intermediate connectors and a plurality of pipe elements, wherein arms of all the connectors are aligned in a main direction and a pipe element being arranged between each adjacent connectors, the method being characterized in that all the connectors are produced as claimed in claim 3 and are arranged in such a way that the axes of the arms make a constant angle with the main direction, said constant angle being equal to 90°−said angle of the impressions of the arms/2.

6. The method as claimed in claim 5, wherein a T-shaped connector arranged at the end of the hydraulic backleak circuit is rotated about the axis of the body by an angle equal to said angle of the impressions of the arms with respect to the other T-shaped connectors of the hydraulic backleak circuit.

7. The method as claimed in claim 5 wherein each one of the plurality of the pipe elements is arranged between respective adjacent connectors and wherein each of one of the plurality of pipe elements have identical lengths.

* * * * *